(12) United States Patent
Takahashi et al.

(10) Patent No.: US 12,474,163 B2
(45) Date of Patent: Nov. 18, 2025

(54) DISPLACEMENT SENSOR, AND DISPLACEMENT MEASUREMENT SYSTEM USING DISPLACEMENT SENSOR

(71) Applicant: Panasonic Intellectual Property Management Co., Ltd., Osaka (JP)

(72) Inventors: Yoshie Takahashi, Osaka (JP); Kazuto Fukuda, Osaka (JP); Takafumi Okuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 296 days.

(21) Appl. No.: 18/474,318

(22) Filed: Sep. 26, 2023

(65) Prior Publication Data

US 2024/0019242 A1    Jan. 18, 2024

Related U.S. Application Data

(63) Continuation of application No. PCT/JP2022/009904, filed on Mar. 8, 2022.

(30) Foreign Application Priority Data

Apr. 14, 2021 (JP) .................. 2021-068385

(51) Int. Cl.
*G01L 1/24* (2006.01)
*G01B 11/16* (2006.01)

(52) U.S. Cl.
CPC ............. *G01B 11/16* (2013.01); *G01L 1/247* (2013.01)

(58) Field of Classification Search
CPC .......... G01B 11/16; G01B 11/18; G01L 1/247
See application file for complete search history.

(56) References Cited

U.S. PATENT DOCUMENTS 5,434,878 A * 7/1995 Lawandy .................. H01S 3/06
372/41
8,810,780 B1 * 8/2014 Barcelo .................. G01L 1/241
356/32

(Continued)

FOREIGN PATENT DOCUMENTS

JP       2009-544988       12/2009
JP       2010-522962        7/2010

(Continued)

OTHER PUBLICATIONS

International Search Report of PCT application No. PCT/JP2022/009904 dated May 24, 2022.

*Primary Examiner* — Freddie Kirkland, III
(74) *Attorney, Agent, or Firm* — Wenderoth, Lind & Ponack, L.L.P.

(57) ABSTRACT

A displacement sensor includes a first emission particles layer provided to be contactable with a measurement object, and in which first emission particles that emit light at a first wavelength by excitation energy are distributed over at least a one-dimensional extent, a second emission particles layer in which second emission particles that emit light at a second wavelength different from the first wavelength by the excitation energy are distributed over the above one-dimensional extent, and a spacer layer that separates the first emission particles layer and the second emission particles layer in a direction intersecting the above one-dimensional extent, and which includes an excitation energy absorbent that absorbs the excitation energy.

11 Claims, 4 Drawing Sheets

(56) References Cited

U.S. PATENT DOCUMENTS

| | | | |
|---|---|---|---|
| 9,423,243 B1* | 8/2016 | Ikeda | G01B 11/168 |
| 10,281,345 B2* | 5/2019 | Uemura | G01B 11/18 |
| 10,317,341 B2* | 6/2019 | Harris | G01N 21/31 |
| 10,655,953 B2* | 5/2020 | Ikeda | G01N 21/25 |
| 11,324,973 B2* | 5/2022 | Petterson | G21K 1/087 |
| 11,609,085 B2* | 3/2023 | Takahashi | G01L 1/247 |
| 11,946,606 B2* | 4/2024 | Ueda | F21K 9/64 |
| 2005/0169348 A1* | 8/2005 | Chen | G01K 11/20 |
| | | | 374/161 |
| 2007/0189359 A1* | 8/2007 | Chen | B82Y 30/00 |
| | | | 374/161 |
| 2010/0022893 A1* | 1/2010 | Hart | G01B 11/022 |
| | | | 600/245 |
| 2011/0152694 A1* | 6/2011 | Shimoyama | A61B 5/6826 |
| | | | 600/480 |
| 2014/0211195 A1* | 7/2014 | Barcelo | G01L 1/241 |
| | | | 356/32 |
| 2018/0017489 A1* | 1/2018 | Harris | G01N 21/658 |
| 2018/0113036 A1* | 4/2018 | Uemura | G01B 11/16 |
| 2018/0180496 A1* | 6/2018 | Uemura | G01L 1/2293 |
| 2018/0304549 A1 | 10/2018 | Safai et al. | |
| 2019/0219462 A1* | 7/2019 | Nada | G01L 1/205 |
| 2021/0061753 A1 | 3/2021 | Haruyama et al. | |
| 2021/0333095 A1* | 10/2021 | Takahashi | G01L 1/247 |
| 2022/0190246 A1 | 6/2022 | Ishisone et al. | |

FOREIGN PATENT DOCUMENTS

| | | |
|---|---|---|
| JP | 2016-530482 | 9/2016 |
| JP | 6322247 | 5/2018 |
| JP | 2018-200304 | 12/2018 |
| JP | 2020-181221 | 11/2020 |
| JP | 2021-038208 | 3/2021 |
| WO | 2008/012706 | 1/2008 |
| WO | 2008/121255 | 10/2008 |
| WO | 2014/190234 | 11/2014 |
| WO | 2020/183264 | 9/2020 |

* cited by examiner

DISPLACEMENT SENSOR, AND DISPLACEMENT MEASUREMENT SYSTEM USING DISPLACEMENT SENSOR

TECHNICAL FIELD

The present disclosure relates to a displacement sensor and a surface shape measurement apparatus using the displacement sensor, and more particularly, to a displacement measurement system using a displacement sensor that measures minute displacement or minute pressure.

BACKGROUND ART

Conventionally, a system in which a pressure-sensitive resin is combined with a large number of thin film transistors is known as a system for measuring displacement or pressure. The pressure-sensitive resin is obtained by dispersing conductive particles in an insulating resin such as silicone rubber. In a pressure-sensitive resin, when pressure is applied, the conductive particles come into contact with each other in the insulating resin, therefore a resistance value thereof decreases. As a result, the pressure applied to the pressure-sensitive resin can be detected. The large number of thin film transistors are arranged in a matrix and function as electrodes.

In addition, a pressure sensor having a pressure-sensitive layer and a plurality of electrodes disposed facing each other at a predetermined gap is also known (see, for example, PTL 1). For example, in the technique described in PTL 1, by arranging individual electrodes having varying gaps between the pressure-sensitive layer and the electrodes in a matrix, a pressure measurement range is wide, thus large area measurement is possible.

CITATION LIST

Patent Literature

PTL 1: Japanese Patent No. 6322247

SUMMARY OF THE INVENTION

A displacement sensor according to one aspect of the present disclosure includes a first emission particles layer provided to be contactable with a measurement object, and in which first emission particles emitting light at a first wavelength by excitation energy are distributed over at least a one-dimensional extent, a second emission particles layer in which second emission particles emitting light at a second wavelength different from the first wavelength by excitation energy are distributed over the above one-dimensional extent, and a spacer layer that separates the first emission particles layer and the second emission particles layer in a direction intersecting the above one-dimensional extent, and which includes an excitation energy absorbent that absorbs excitation energy, wherein the first emission particles layer, the second emission particles layer, and the spacer layer are laminated.

A displacement sensor according to another aspect of the present disclosure includes a first emission particles layer provided to be contactable with a measurement object, and in which first emission particles emitting light at a first wavelength by excitation energy are distributed over at least a one-dimensional extent, a second emission particles layer in which second emission particles emitting light at a second wavelength different from the first wavelength by excitation energy are distributed over the above one-dimensional extent, a first spacer layer that separates the first emission particles layer and the second emission particles layer in a direction intersecting the above one-dimensional extent, and which includes an excitation energy absorbent that absorbs excitation energy, a third emission particles layer in which third emission particles emitting light at a third wavelength different from the first wavelength and the second wavelength by excitation energy are distributed over the above one-dimensional extent, a fourth emission particles layer in which fourth emission particles emitting light at a fourth wavelength different from the first wavelength, the second wavelength, and the third wavelength by excitation energy are distributed over the above one-dimensional extent, a second spacer layer that separates the third emission particles layer and the fourth emission particles layer in the direction intersecting the above one-dimensional extent, and an energy movement inhibition layer that separates the second emission particles layer and the third emission particles layer in the direction intersecting the above one-dimensional extent, wherein the first emission particles layer, the first spacer layer, the second emission particles layer, the energy movement inhibition layer, the third emission particles layer, the second spacer layer, and the fourth emission particles layer are sequentially laminated.

DESCRIPTION OF EMBODIMENT

In a conventional configuration, since individual electrodes are arranged having varying gaps therebetween, a constant pressing region is required, thus measuring a minute region is difficult. In addition, since individual electrodes are arranged, there is a problem that in order to measure samples having a large measurement area, a circuit becomes more complex.

In addition, since an optical film is separately provided, there is a problem that physical properties of the optical film are impacted when minute irregularities and pressure on a surface are measured, thus accuracy is reduced.

The present disclosure solves the conventional problems, and an object of the present disclosure is to provide a displacement sensor capable of improving measurement accuracy and simplify displacement measurement in a minute region, and a displacement measurement system using the displacement sensor.

A displacement sensor according to a first aspect includes a first emission particles layer provided to be contactable with a measurement object, and in which first emission particles emitting light at a first wavelength by excitation energy are distributed over at least a one-dimensional extent, a second emission particles layer in which second emission particles emitting light at a second wavelength different from the first wavelength by the excitation energy are distributed over the one-dimensional extent, and a spacer layer that separates the first emission particles layer and the second emission particles layer in a direction intersecting an extent, and which includes an excitation energy absorbent that absorbs the excitation energy.

In a displacement sensor according to a second aspect, an emission spectrum of one of the first emission particles and the second emission particles may overlap an absorption spectrum of another of the first emission particles and the second emission particles in the first aspect.

In a displacement sensor according to a third aspect, at least one of a semiconductor nanoparticle and an organic dye may be used as the first emission particles and the second emission particles in the first aspect or the second aspect.

In a displacement sensor according to a fourth aspect, the second emission particles may be away from a contact surface of the displacement sensor farther than the first emission particles are, the contact surface being in contact with the measurement object, and the second emission particles may have a shorter emission peak wavelength than the first emission particles in any of the above first aspect to third aspect.

A displacement sensor according to a fifth aspect includes a first emission particles layer provided to be contactable with a measurement object, and in which first emission particles emitting light at a first wavelength by excitation energy are distributed over at least a one-dimensional extent, a second emission particles layer in which second emission particles emitting light at a second wavelength different from the first wavelength by the excitation energy are distributed over the above one-dimensional extent, a first spacer layer that separates the first emission particles layer and the second emission particles layer in a direction intersecting the above one-dimensional extent, and which includes an excitation energy absorbent that absorbs excitation energy, a third emission particles layer in which third emission particles emitting light at a third wavelength different from the first wavelength and the second wavelength by the excitation energy are distributed over the above one-dimensional extent, a fourth emission particles layer in which fourth emission particles emitting light at a fourth wavelength different from the first wavelength, the second wavelength, and the third wavelength by the excitation energy are distributed over the above one-dimensional extent, a second spacer layer that separates the third emission particles layer and the fourth emission particles layer in the direction intersecting the above one-dimensional extent, and an energy movement inhibition layer that separates the second emission particles layer and the third emission particles layer in the direction intersecting the above one-dimensional extent, wherein the first emission particles layer, the first spacer layer, the second emission particles layer, the energy movement inhibition layer, the third emission particles layer, the second spacer layer, and the fourth emission particles layer are sequentially laminated.

In a displacement sensor according to a sixth aspect, an emission spectrum of one of the first emission particles and the second emission particles may overlap an absorption spectrum of another of the first emission particles and the second emission particles in the fifth aspect.

In a displacement sensor according to a seventh aspect, at least one of a semiconductor nanoparticle and an organic dye may be used as the first emission particles and the second emission particles in the fifth aspect or the sixth aspect.

In a displacement sensor according to an eighth aspect, the second emission particles may be away from a contact surface of the displacement sensor farther than the first emission particles are, the contact surface being in contact with the measurement object, and the second emission particles may have a shorter emission peak wavelength than the first emission particles in any of the above fifth aspect to seventh aspect.

A displacement measurement system according to a ninth aspect uses the displacement sensor according to any of the above first aspect to eighth aspect.

A pressure measurement system according to a tenth aspect uses the displacement sensor according to any of the above first aspect to eighth aspect.

A displacement measurement system according to an eleventh aspect includes the displacement sensor according to any of the above first aspect to eighth aspect, an excitation energy source that causes two or more types of the first emission particles and the second emission particles included in the displacement sensor to emit light, and a light receiver that receives light emitted from the displacement sensor.

As described above, according to the displacement sensor according to one aspect of the present disclosure and the displacement measurement system using the displacement sensor, it is possible to measure displacement or pressure in a minute region with high accuracy.

The displacement sensor and the displacement measurement system using the displacement sensor according to exemplary embodiments will be described below with reference to the attached drawings. Note that substantially identical members are denoted by identical reference numerals in the drawings.

First Exemplary Embodiment

Figure 1:
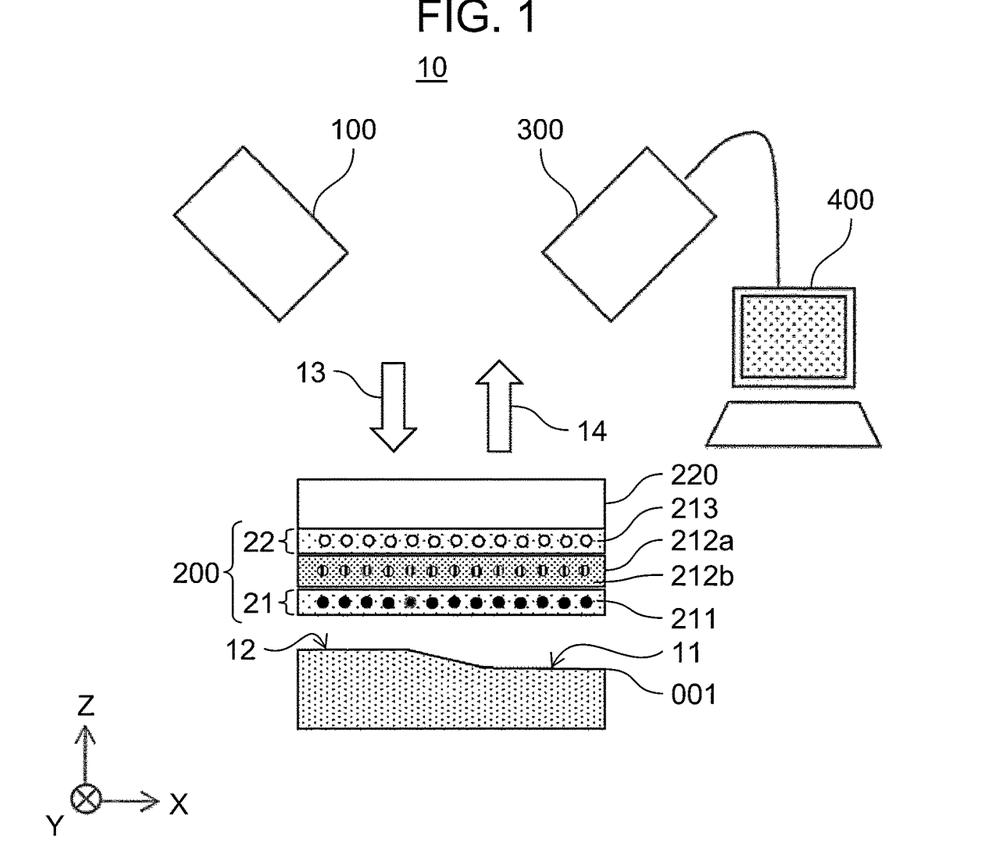
FIG. 1 is a schematic view illustrating a configuration of a displacement sensor and a displacement measurement system using the displacement sensor according to a first exemplary embodiment.

FIG. 1 is a schematic view illustrating a configuration of displacement sensor 200 and displacement measurement system 10 using displacement sensor 200 according to a first exemplary embodiment. Note that for convenience, an in-plane indicating a one-dimensional extent in a plane of displacement sensor 200 is indicated as an X-Y plane, a right side on the paper is indicated as an X direction, and a vertically upward direction is indicated as a Z direction in the drawings.

<Displacement Sensor>

Figure 3:
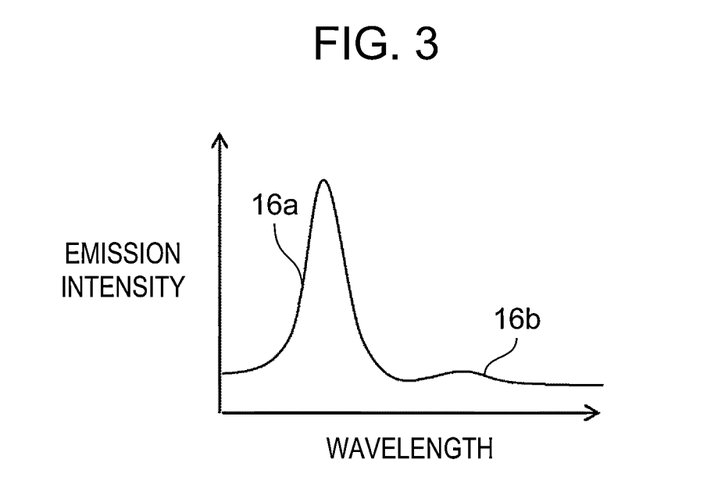
FIG. 3 is a graph illustrating an emission spectrum from a recess of the measurement object.
Figure 4:
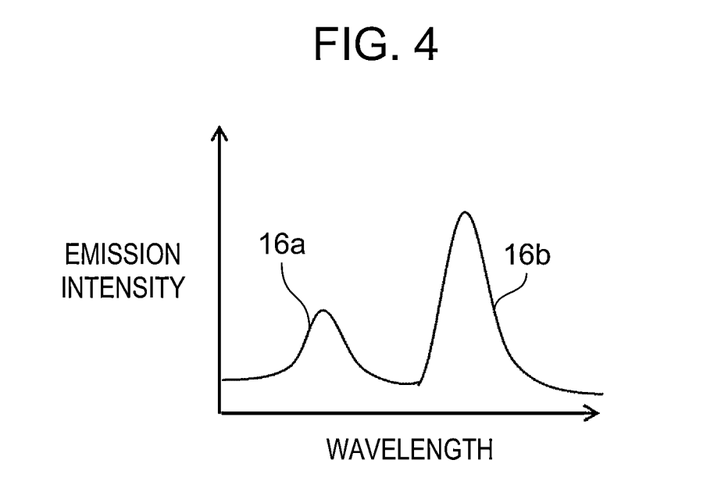
FIG. 4 is a graph illustrating an emission spectrum from a projection of the measurement object.

In FIG. 1, displacement sensor 200 is provided to be contactable with measurement object 001, and includes first emission particles layer 21, spacer layer 212a, and second emission particles layer 22. In first emission particles layer 21, first emission particles 211 emitting light at a first wavelength by excitation energy are distributed over at least a one-dimensional extent (X-Y plane). In second emission particles layer 22, second emission particles 213 emitting light at a second wavelength different from the first wavelength by excitation energy are distributed over the above one-dimensional extent. Spacer layer 212a separates first emission particles layer 21 and second emission particles layer 22 in a direction intersecting the above one-dimensional extent (Z direction). Spacer layer 212a includes excitation energy absorbent 212b that absorbs excitation energy. Second emission particles 213 are caused to emit light by excitation energy (16a: FIG. 3, FIG. 4), and first emission particles 211 are caused to emit light in accordance with a distance between first emission particles 211 and second emission particles 213 (16b: FIG. 3, FIG. 4). Due to the distribution of emission wavelengths, it is possible to detect a change in the distance between the two types of first emission particles layer 21 and second emission particles layer 22 (Z direction), thus it is possible to measure displacement or pressure in a minute region with high accuracy. Note that displacement sensor 200 may be supported by support 220.

Each member included in displacement sensor 200 will be described below.

Displacement sensor 200 is provided to be contactable with measurement object 001. In addition, a layer structure of displacement sensor 200 includes first emission particles layer 21 and second emission particles layer 22 facing each other with spacer layer 212a disposed therebetween. Spacer layer 212a includes excitation energy absorbent 212b that absorbs excitation energy, and first emission particles layer 21 is provided on a surface side in contact with measurement object 001.

<Emission Particles>

First emission particles layer 21 and second emission particles layer 22 include, respectively, the two types of first emission particles 211 and second emission particles 213 that emit different wavelengths of emission 14 by excitation energy. In first emission particles layer 21 and second emission particles layer 22, first emission particles 211 and second emission particles 213 are distributed over at least a one-dimensional extent. Specifically, in the case of FIG. 1, first emission particles 211 and second emission particles 213 are distributed over an X-Y plane, that is, over a two-dimensional extent. Note that the distribution is not limited hereto, and may be distributed only in the X direction, that is, over a one-dimensional extent.

Figure 2:
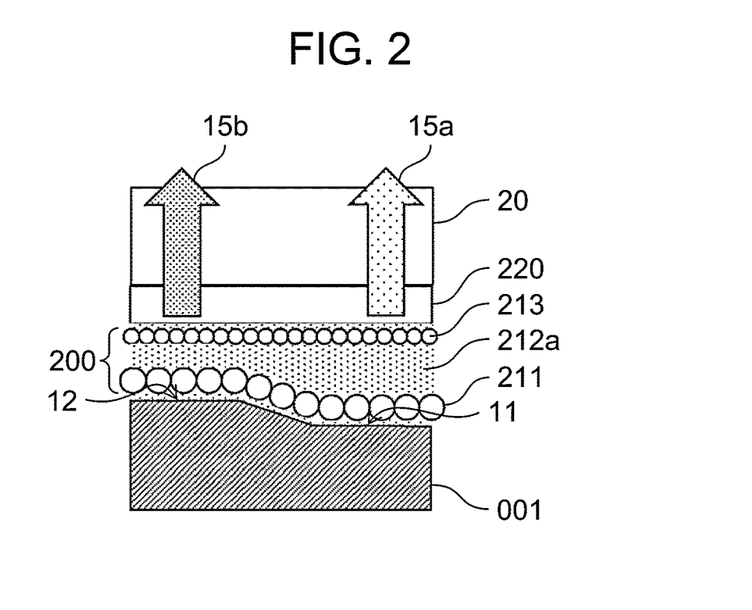
FIG. 2 is a schematic cross-sectional view illustrating a state in which the displacement sensor of FIG. 1 is brought into contact with a measurement object along a surface thereof by a pressurization member.

A combination of materials in which second emission particles 213 emit light at a shorter wavelength than first emission particles 211 is selected as the emission wavelengths of first emission particles 211 and second emission particles 213 (FIG. 2 and FIG. 3). Semiconductor nanoparticles having cadmium sulfide, cadmium selenide, cadmium telluride, zinc sulfide, zinc selenide, zinc telluride, copper indium sulfide, silver indium sulfide, indium phosphide, or a mixed crystal material thereof as a core, perovskite-type semiconductor nanoparticles such as lead cesium halide, semiconductor nanoparticles having silicon, carbon, or the like as a core, or organic dyes such as merocyanine and perylene can be used as first emission particles 211 and second emission particles 213.

The two or more types of first emission particles 211 and second emission particles 213 may be any particle size provided that a quantum size effect of the semiconductor nanoparticle can be obtained, and between 1 nm and 100 nm (inclusive) is preferred. The particle size is more preferably between 1 nm and 50 nm (inclusive). Even when a raw material is a powder, the organic dye is not impacted by a particle size of the raw material powder.

<Support>

Support 220 is not particularly limited provided that a material thereof is easy to handle and does not inhibit emission 14 from first emission particles 211 and second emission particles 213. For example, polyethylene terephthalate, polyacrylamide, polycarbonate, or the like can be used. However, support 220 is not necessarily a required constituent provided that there are no problems with handling displacement sensor 200.

<Spacer Layer>

Spacer layer 212a is not particularly limited provided that a material thereof is compressed by pressure and does not inhibit emission 14 from first emission particles 211 and second emission particles 213, however the material is partially limited depending on a later-described manufacturing method.

A thickness of spacer layer 212a is preferably between 1 nm and 1000 nm (inclusive). The thickness is more preferably between 1 nm and 500 nm (inclusive), and still more preferably between 3 nm and 300 nm (inclusive). When the thickness is more than or equal to 1 nm, it is possible to ensure a distance between first emission particles 211 and second emission particles 213 necessary for detection. When the thickness is less than or equal to 1000 nm, a change in the distance between first emission particles 211 and second emission particles 213 due to displacement of contacted measurement object 001 is more likely to occur, thus accuracy of the sensor is enhanced.

A method for manufacturing spacer layer 212a is not particularly limited, however a method capable of controlling a thin film such as a layer by layer (LBL) method or a spin coater method, for example, can be used.

Here, the LBL method is a method capable of controlling a thin film by alternately adsorbing cationic polymers and anionic polymers by electrostatic force.

While not particularly limited, the material of spacer layer 212a is partially limited depending on the method adopted. For example, in the LBL method, ionic polymers such as polyallylamine, polydiallyldimethylammonium chloride, and other cationic polymers, and polyacrylic acid, polystyrene sulfonic acid, polyisoprene sulfonic acid, and other anionic polymers, or copolymers containing these, can be used. In addition, the spin coater method is not particularly limited provided that a material used therein dissolves in a solvent, and the above-described ionic polymers, silicone resin, polyvinyl chloride, polyurethane, polyvinyl alcohol, polypropylene, polyacrylamide, polycarbonate, polyethylene terephthalate, or the like can be used. By controlling the thickness of spacer layer 212a, the distance between the two types of emission particles emitting light in the plane can be arbitrarily controlled.

<Excitation Energy Absorbent>

Excitation energy absorbent 212b is not particularly limited provided that a material thereof absorbs excitation energy. When an excitation energy is excitation light 13 and excitation light 13 is ultraviolet light having a wavelength less than or equal to 400 nm, examples of an ultraviolet absorber include, for example, benzotriazole-based materials, benzophenone-based materials, and triazine-based materials. When excitation light 13 is visible light from 400 nm to 500 nm, examples include merocyanine-based materials and azo-based materials.

These materials may be added at the time of manufacturing spacer layer 212a, or a polymer in which these material systems are imparted to a polymer material may be used.

A content of excitation energy absorbent 212b is preferably between 1% and 25% (inclusive) relative to a thickness t of spacer layer 212a. The content is further preferably between 5% and 20% (inclusive). When the content is more than or equal to 1%, absorption strength is high, therefore improved accuracy can be obtained. In addition, when the content is less than or equal to 25%, the thickness of spacer layer 212a is likely to change, thus accuracy of the sensor is enhanced.

By providing excitation energy absorbent 212b, measurement object 001 can be protected from excitation energy, for example, ultraviolet rays.

Note that excitation energy absorbent 212b may be distributed over an entirety of spacer layer 212a or unevenly distributed as an excitation energy absorption layer in one part of spacer layer 212a.

<Displacement Measurement System>

As shown in FIG. 1, displacement measurement system 10 according to the first exemplary embodiment uses displacement sensor 200 described above. Displacement measurement system 10 includes excitation energy source 100, displacement sensor 200, emission reception element 300, and image analyzer 400. Displacement sensor 200 is as described above, thus description thereof is omitted. Two or more types of first emission particles 211 and second emission particles 213 included in displacement sensor 200 are caused to emit light by excitation light 13 from excitation energy source 100. Emission reception element 300 receives emission 14 from displacement sensor 200.

According to displacement measurement system 10, there is provided displacement sensor 200 in which two or more types of first emission particles 211 and second emission particles 213 having different emission wavelengths are distributed over at least a one-dimensional extent. Therefore, due to the distribution of emission wavelengths, it is possible to detect a change in the distance between the two types of first emission particles layer 21 and second emission particles layer 22 (Z direction), thus it is possible to measure displacement or pressure in a minute region.

Each member included in displacement measurement system 10 will be described below.

<Excitation Energy Source>

Excitation energy source 100 is not particularly limited provided that it is an excitation energy source capable of exciting first emission particles 211 and second emission particles 213 included in displacement sensor 200. For example, a light energy source (FIG. 1) or an electrical energy source can be used. Note that the excitation energy source is not limited to the light energy source illustrated in FIG. 1. In addition, in order to make a collective evaluation within an observation range, excitation energy may be uniformly supplied to first emission particles 211 and second emission particles 213 by excitation energy source 100.

<Emission Reception Element>

Emission reception element 300 is not particularly limited provided that it is a light reception element capable of receiving changes in emission behavior of first emission particles 211 and second emission particles 213. In particular, a CCD, a CMOS, an image sensor, or the like that can make a collective evaluation within an observation range, for example, can be used. By using these, it is possible to instantaneously analyze emission behavior within an observation range.

Note that when the light energy source is used as the excitation energy source, it is preferable to suppress an impact of wavelength of excitation energy source 100 using a wavelength cut filter in order to increase detection sensitivity in emission reception element 300.

<Image Analyzer>

In addition, image analyzer 400 may be further included to measure displacement of measurement object 001 in contact with displacement sensor 200 based on wavelength distribution of a received emission. It is preferable that image analyzer 400 can analyze an obtained image by chromaticity and luminance, and calculate coordinates at which a difference in chromaticity and a difference in luminance from the surroundings are obtained. Image analyzer 400 measures the displacement of measurement object 001 in contact with displacement sensor 200 based on the wavelength distribution of received emission 14. Specifically, due to the wavelength distribution of obtained emission 14, it is possible to detect a change in the distance between the two types of first emission particles 211 and second emission particles 213, thus it is possible to measure displacement or pressure in a minute region. The principle of displacement measurement will be described in detail later.

Note that in displacement measurement system 10, excitation energy source 100 and emission reception element 300 are disposed in an oblique direction relative to a plane of displacement sensor 200, however the above disposition is merely an example, and a disposition hereof is not particularly limited.

<Principle of Displacement Measurement>

Next, the principle of displacement measurement in displacement measurement system 10 will be described according to the first exemplary embodiment.

A case where a fluorescence spectrum (emission spectrum) of one emission particle (donor) overlaps an excitation spectrum (absorption spectrum) of another emission particle (acceptor) is considered to be the two or more types of emission particles having different emission wavelengths. In this case, when two emission particles having different emission wavelengths are close to each other, a behavior is known in which excitation energy excites an acceptor before a donor excited by the excitation energy emits light. This behavior is called Förster resonance energy transfer (FRET), and the behavior of wavelength distribution of the emission spectrum of two types of emission particles depends on the distance between the two types of emission particles. In particular, when FRET efficiency is set as a ratio of the number of energy transfers per donor excitation number, the FRET efficiency is inversely proportional to the sixth power of the distance between the two types of emission particles. Therefore, even a slight change in distance greatly impacts a change in the emission spectrum.

In displacement measurement system 10 using displacement sensor 200, by installing displacement sensor 200 on measurement object 001 and applying a constant load using the above-described principle, when there are minute irregularities on measurement object 001, a load on displacement sensor 200 is different from other places only at a portion with irregularities. As a result, an amount of compression at a portion of displacement sensor 200 corresponding to the portion with irregularities of measurement object 001 changes from other portions, that is, the distance between the two types of emission particles layers changes only at the portion with irregularities. An emission spectrum is changed by the FRET effect in accordance with a change in the distance between the two types of emission particles layers. Therefore, by measuring the emission spectra of the two types of emission particles, a change in emission spectrum generated at the portion with irregularities in the plane can be converted into a change in the distance between the two types of emission particles layers, that is, into displacement of measurement object 001. In addition, it is also possible to measure a reference type before measuring measurement object 001, and measure a relationship between a portion with minute irregularities and displacement from a difference between a measurement using measurement object 001 and a measurement of the reference type.

In order to calculate as an amount of displacement, an emission spectrum change may be measured with a known material having a difference in displacement.

Here, a change in emission spectrum will be described in more detail. A case where a semiconductor nanoparticle is used, for example, as an emission particle will be described. Semiconductor nanoparticles are nano-sized particles having a semiconductor crystal, and these particles have a characteristic in that an emission spectrum changes in accordance with particle diameter due to a quantum size effect. In addition, even when the particles have an identical particle diameter, they have a characteristic in that the emission spectrum changes when the materials are different, thus it is possible to realize various emission spectra.

Note that when the emission particles have an identical particle diameter and different material systems, the larger the energy gap that the material itself has, the more the emission is shown on the shorter wavelength side.

FIG. 2 is a schematic cross-sectional view illustrating a state in which displacement sensor 200 of FIG. 1 is brought into contact with measurement object 001 along a surface thereof by pressurization member 20. FIG. 3 is a graph illustrating an emission spectrum from recess 11 of measurement object 001. FIG. 4 is a graph illustrating an emission spectrum from projection 12 of measurement object 001.

Semiconductor nanoparticles having emission wavelengths on the shorter wavelength side are referred to as semiconductor nanoparticles (second emission particles) 213, while semiconductor nanoparticles having emission wavelengths on the longer wavelength side are referred to as semiconductor nanoparticles (first emission particles) 211. Recess 11 of measurement object 001 in FIG. 2 is in a state in which a distance between the two of first emission particles 211 and second emission particles 213 is sufficiently large. In this state, as shown in FIG. 3, since movement of excitation energy from second emission particles 213 to first emission particles barely occurs, emission 16b of first emission particles 211 is marginal. Therefore, since the excitation energy is absorbed by excitation energy absorbent 212b, only emission spectrum 15a and emission spectrum 16a of second emission particles 213 are obtained (FIG. 3). Meanwhile, projection 12 of measurement object 001 in FIG. 2 is in a state in which a distance between first emission particles 211 and second emission particles 213 is small. In this state, as shown in FIG. 4, second emission particles 213 are excited in accordance with a distance between first emission particles 211 and second emission particles 213, an energy movement (FRET) from second emission particles 213 to first emission particles 211 occurs before second emission particles 213 emit light, and the energy that should be emitted from second emission particles 213 is used for the emission of first emission particles 211. As a result, as shown in FIG. 4, an intensity of emission spectrum 16a of second emission particles 213 decreases, and emission spectrum 16b of first emission particles 211 emerges (FIG. 4). That is, in an entirety of emission spectrum 15b of the two of first emission particles 211 and second emission particles 213, the intensity of emission spectrum 16a of second emission particles 213 on the shorter wavelength side decreases more than the intensity of emission spectrum 16a when alone, and an intensity of emission spectrum 16b of first emission particles 211 on the longer wavelength side has a newly emergent wavelength distribution. A behavior of wavelength distribution of an entirety of emission spectrum 15a and emission spectrum 15b changes in accordance with the distance between the two of second emission particles 213 and first emission particles 211.

At this time, due to an absorption wavelength of second emission particles on the shorter wavelength side, a type of excitation energy absorbent is changed depending on whether the absorption wavelength is in an ultraviolet region less than or equal to 400 nm, or in a visible region of 400 nm to 500 nm. In any case, the principle is as described above.

Therefore, it is possible to calculate the change in the distance between the two types of semiconductor nanoparticles 213 and semiconductor nanoparticles 211, that is, displacement of the measurement object, based on the wavelength distribution of emission spectra in the plane of the displacement sensor.

Note that pressure received from the measurement object may be calculated instead of calculating displacement of the measurement object based on the wavelength distribution of emission spectra in the plane of the displacement sensor.

As described above, when a FRET phenomenon occurs, emission spectrum 16a of second emission particles emitting light on the shorter wavelength side decreases, while emission spectrum 16b of first emission particles emitting light on the longer wavelength side is enhanced. The emission peak wavelength of second emission particles 213 on the shorter wavelength side and the emission peak wavelength of first emission particles 211 on the longer wavelength side are preferably separated by a distance more than or equal to 10 nm. The distance is more preferably more than or equal to 30 nm. When the emission peak wavelength is shorter than 10 nm, the emission peak intensity of the spectrum having a lower emission intensity overlaps with another spectrum, thus detecting a change in wavelength distribution in the emission spectrum is difficult.

Second Exemplary Embodiment

Figure 5:
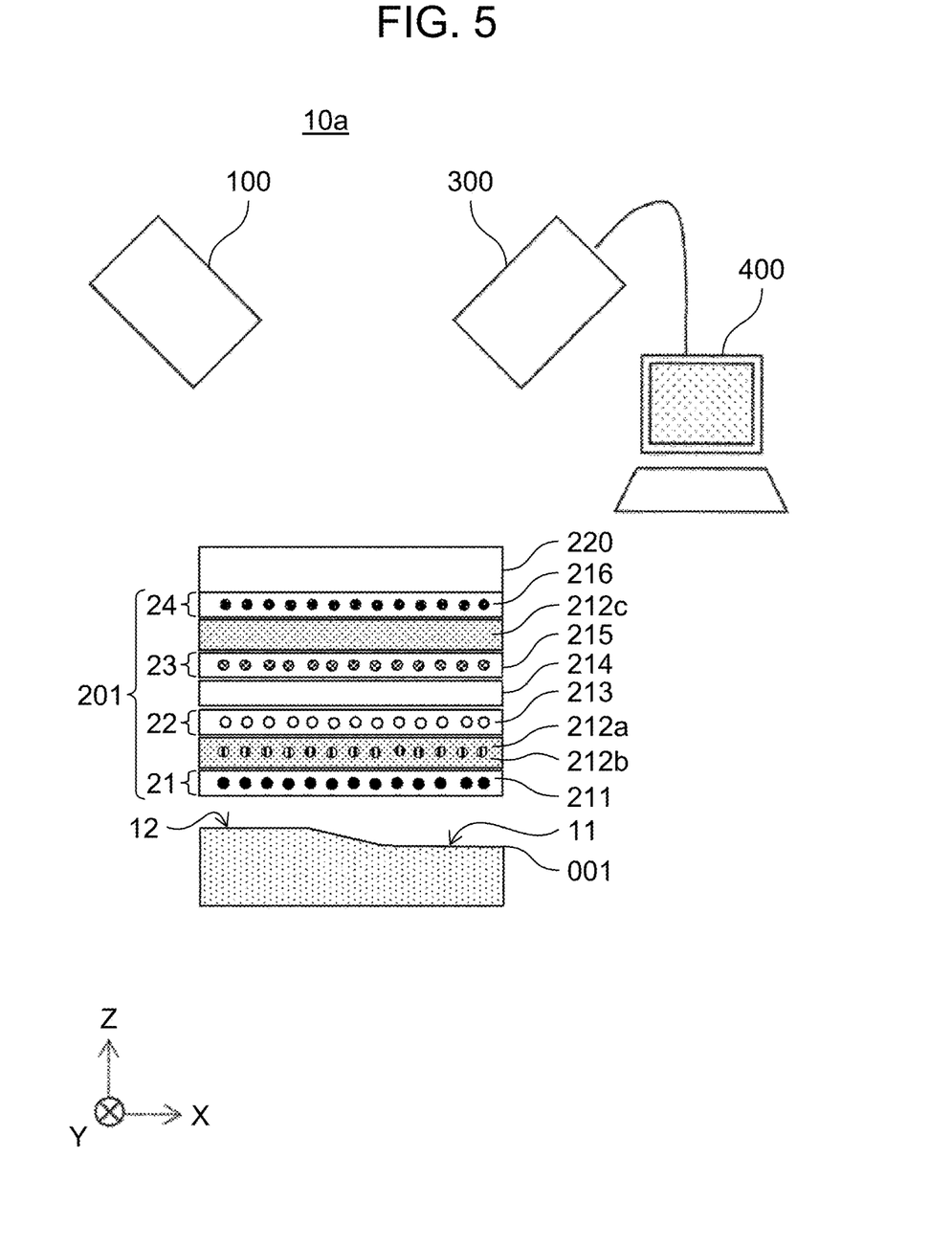
FIG. 5 is a schematic view illustrating a configuration of a displacement sensor and a displacement measurement system using the displacement sensor according to a second exemplary embodiment.

FIG. 5 is a schematic view illustrating a configuration of displacement sensor 201 and displacement measurement system 10a using displacement sensor 201 according to a second exemplary embodiment. Note that for convenience, an in-plane indicating a one-dimensional extent in a plane of displacement sensor 201 is indicated as an X-Y plane, a right side on the paper is indicated as an X direction, and a vertically upward direction is indicated as a Z direction in the drawings.

In FIG. 5, displacement sensor 201 is provided to be contactable with measurement object 001, and includes first emission particles layer 21, first spacer layer 212a, second emission particles layer 22, energy movement inhibition layer 214, third emission particles layer 23, second spacer layer 212c, and fourth emission particles layer 24, wherein first emission particles layer 21, first spacer layer 212a, second emission particles layer 22, energy movement inhibition layer 214, third emission particles layer 23, second spacer layer 212c, and fourth emission particles layer 24 are sequentially laminated. In first emission particles layer 21, first emission particles 211 emitting light at a first wavelength by excitation energy are distributed over at least a one-dimensional extent (X-Y plane). In second emission particles layer 22, second emission particles 213 emitting light at a second wavelength different from the first wavelength by excitation energy are distributed over the above one-dimensional extent. In third emission particles layer 23, third emission particles 215 emitting light at a third wavelength different from the first wavelength and the second wavelength by excitation energy are distributed over the above one-dimensional extent. In fourth emission particles layer 24, fourth emission particles 216 emitting light at a fourth wavelength different from the first wavelength, the second wavelength, and the third wavelength by excitation energy are distributed over the above one-dimensional extent. First spacer layer 212a separates first emission particles layer 21 and second emission particles layer 22 in a direction intersecting the above one-dimensional extent (Z direction). First spacer layer 212a includes excitation energy absorbent 212b that absorbs excitation energy. Energy movement inhibition layer 214 separates second emission particles layer 22 and third emission particles layer 23 in the direction intersecting the above one-dimensional extent (Z direction). Second spacer layer 212c separates third emission particles layer 23 and fourth emission particles layer 24 in the direction intersecting the above one-dimensional extent. Second emission particles 213, third emission particles 215, and fourth emission particles 216 are caused to emit light by excitation energy, while first emission particles 211 are caused to emit light in accordance with a distance between first emission particles 211 and second emission particles 213. Due to the distribution of emission wavelengths, it is possible to detect a distance between first emission particles 211 and second emission particles 213, and a distance between third emission particles 215 and fourth emission particles 216, thus it is possible to measure displacement or pressure in a minute region with high accuracy.

Note that displacement sensor 201 may be supported by support 220.

Displacement sensor 201 according to the second exemplary embodiment includes first emission particles layer 21, first spacer layer 212a, second emission particles layer 22, energy movement inhibition layer 214, third emission particles layer 23, second spacer layer 212c, and fourth emission particles layer 24. A layer in contact with measurement object 001 is first emission particles layer 21, and only first spacer layer 212a includes excitation energy absorbent 212b.

Note that since the constituent elements of first emission particles 211, second emission particles 213, third emission particles 215, and fourth emission particles 216, first spacer layer 212a and second spacer layer 212c, and excitation energy absorbent 212b are identical to the constituent elements of the first exemplary embodiment, descriptions thereof are omitted.

<Energy Movement Inhibition Layer>

In order to utilize the above-described FRET effect, the distance between the first emission particles and the second emission particles and the distance between the third emission particles and the fourth emission particles may be detected. In this case, the displacement sensor may include two pairs of laminated emission particles layers for a total of four layers, with one pair including two types of emission particles. Therefore, in order to suppress excitation energy movement between second emission particles layer 22 and third emission particles layer 23, which each constitute a separate pair, energy movement inhibition layer 214 may be provided to separate second emission particles layer 22 and third emission particles layer 23.

A thickness of energy movement inhibition layer 214 is preferably between 15 nm and 1000 nm (inclusive). The thickness is more preferably between 20 nm and 500 nm (inclusive). When the thickness is more than or equal to 15 nm, energy movement between the second emission particles and the third emission particles is prevented or reduced, thus accuracy of the sensor is enhanced. When the thickness is less than or equal to 1000 nm, conformability to minute irregularities is improved, thus accuracy of the sensor is enhanced.

A material of energy movement inhibition layer 214 is not particularly limited provided that the material is not as compressed as materials of first spacer layer 212a and second spacer layer 212c and does not inhibit emission, and examples include, for example, a silicon oxide-based material.

Note that since the principle of displacement measurement by displacement sensor 200 is similar to the principle of displacement measurement of the first exemplary embodiment, description thereof is omitted.

Figure 6:
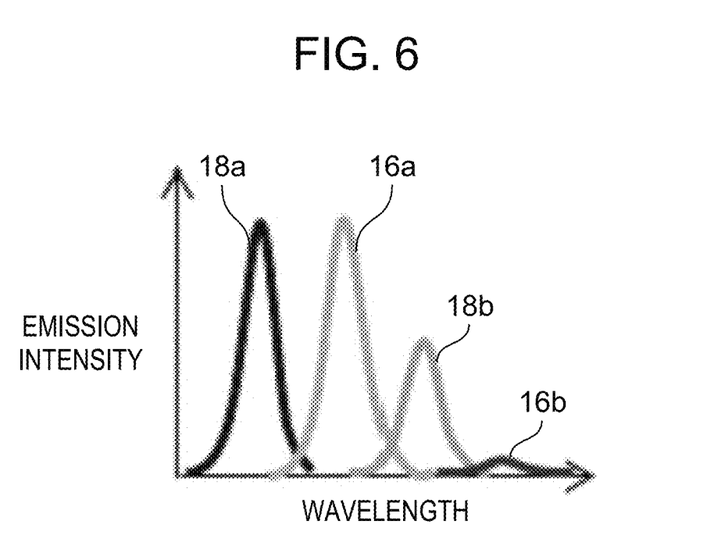
FIG. 6 is a graph illustrating an emission spectrum from a recess of a measurement object.
Figure 7:
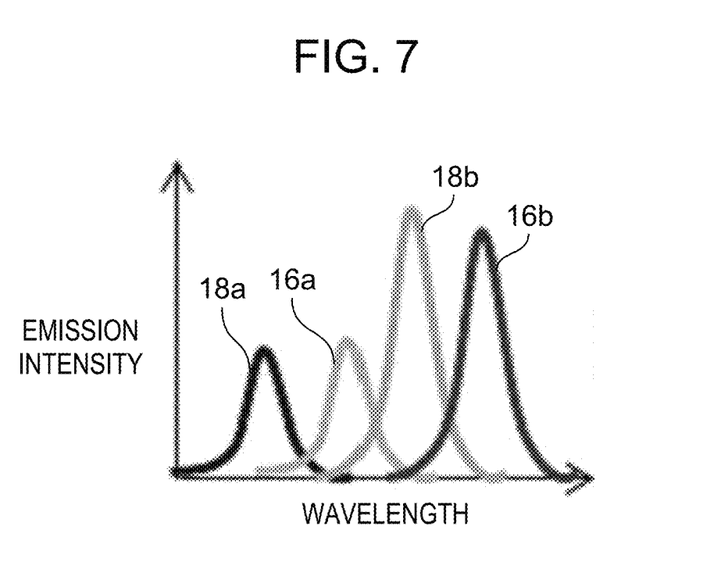
FIG. 7 is a graph illustrating an emission spectrum from a projection of the measurement object.

FIG. 6 is a graph illustrating an emission spectrum from recess 11 of measurement object 001. FIG. 7 is a graph illustrating an emission spectrum from projection 12 of measurement object 001.

Recess 11 of measurement object 001 in FIG. 5 is in a state in which the distance between first emission particles 211 and second emission particles 213 is sufficiently large, and a state in which the distance between third emission particles 215 and fourth emission particles 216 is sufficiently large. In this state, as shown in FIG. 6, since movement of excitation energy from second emission particles 213 to first emission particles 211, and movement of excitation energy from fourth emission particles 216 to fifth emission particles barely occurs, emission 16b of first emission particles 211 is marginal. Therefore, since the excitation energy is absorbed by excitation energy absorbent 212b, emission spectrum 16a of second emission particles 213, emission spectrum 18b of third emission particles 215, and emission spectrum 18a of fourth emission particles 216 are obtained (FIG. 6). Note that since excitation energy absorbent 212b is only provided in first spacer layer 212a, emission 18b through third emission particles 215 preferably has a lower emission intensity than the emission intensity of emission spectrum 18a through fourth emission particles 216 (FIG. 6).

Meanwhile, projection 12 of measurement object 001 in FIG. 5 is in a state in which the distance between first emission particles 211 and second emission particles 213 is small, and a state in which the distance between third emission particles 215 and fourth emission particles 216 is small. In this state, as shown in FIG. 7, second emission particles 213 are excited in accordance with a distance between first emission particles 211 and second emission particles 213, an energy movement (FRET) from second emission particles 213 to first emission particles 211 occurs before second emission particles 213 emit light, and the energy that should be emitted from second emission particles 213 is used for the emission of first emission particles 211. As a result, as shown in FIG. 7, the intensity of emission spectrum 16a of second emission particles 213 decreases, and emission spectrum 16b of first emission particles 211 emerges (FIG. 7). Similarly, an intensity of emission spectrum 18a of fourth emission particles 216 decreases, and emission spectrum 16b of third emission particles 215 increases. That is, in the entire four emission spectra of first emission particles 211, second emission particles 213, third emission particles 215, and fourth emission particles 216, the intensity of emission spectrum 16a of second emission particles 213 and the intensity of emission spectrum 18a of fourth emission particles 216 on the shorter wavelength side decrease more than the intensity of emission spectrum 18a when alone, the intensity of emission spectrum 16b of first emission particles 211 on the longer wavelength side newly emerges, and an intensity of emission spectrum 18b of third emission particles 215 has an increased wavelength distribution. A behavior of wavelength distribution of the entire emission spectra changes in accordance with the distance between second emission particles 213 and first emission particles 211, and the distance between fourth emission particles 216 and third emission particles 215.

Note that since displacement of measurement object 001 in the Z direction is substantially the same as displacement of the distance between second emission particles 213 and first emission particles 211, and the displacement of the distance between the fourth emission particles 216 and third emission particles 215, it is possible to measure the displacement with higher accuracy by measuring the two pairs of distances.

Note that the present disclosure includes an appropriate combination of any exemplary embodiment and/or example among the various above-described exemplary embodiments and/or examples, and effects of each of the exemplary embodiments and/or examples can be achieved.

INDUSTRIAL APPLICABILITY

According to the displacement measurement system according to the present disclosure, it is possible to easily measure displacement or pressure in a minute region with high accuracy, and it is possible to measure even in the case of a non-measurement object deteriorated by ultraviolet rays. The displacement measurement system according to the present disclosure can also be used in applications for measuring minute scratches or irregularities on optical lenses, precision processed parts, and the like.

REFERENCE MARKS IN THE DRAWINGS

001: measurement object
10, 10a: displacement measurement system
11: recess
12: projection
13: excitation light
14: emission
15a: emission spectrum from recess
15b: emission spectrum from projection
16a: emission spectrum of second emission particle
16b: emission spectrum of first emission particle
18a: emission spectrum of fourth emission particle
18b: emission spectrum of third emission particle
20: pressurization member
21: first emission particles layer
22: second emission particles layer
23: third emission particles layer
24: fourth emission particles layer
100: light source
200, 201: displacement sensor
211: emission particle, first emission particle
212a: first spacer layer
212b: excitation energy absorbent
212c: second spacer layer
213: emission particle, second emission particle
214: energy movement inhibitor
215: emission particle, third emission particle
216: emission particle, fourth emission particle
220: support
300: emission reception element
400: image analyzer

The invention claimed is:

1. A displacement sensor comprising:
a first emission particles layer provided to be contactable with a measurement object, and in which first emission particles emitting light at a first wavelength by excitation energy are distributed over at least a one-dimensional extent;
a second emission particles layer in which second emission particles emitting light at a second wavelength different from the first wavelength by the excitation energy are distributed over the one-dimensional extent; and
a spacer layer that separates the first emission particles layer and the second emission particles layer in a direction intersecting the one-dimensional extent, wherein the spacer layer includes an excitation energy absorbent that absorbs the excitation energy.

2. The displacement sensor according to claim 1, wherein an emission spectrum of one of the first emission particles and the second emission particles overlaps an absorption spectrum of another of the first emission particles and the second emission particles.

3. The displacement sensor according to claim 1, wherein at least one of a semiconductor nanoparticle and an organic dye is used as the first emission particles and the second emission particles.

4. The displacement sensor according to claim 1, wherein the second emission particles are away from a contact surface of the displacement sensor farther than the first emission particles are, the contact surface being in contact with the measurement object, and
the second emission particles have a shorter emission peak wavelength than the first emission particles.

5. A displacement sensor comprising:
a first emission particles layer provided to be contactable with a measurement object and in which first emission particles emitting light at a first wavelength by excitation energy are distributed over at least a one-dimensional extent;
a second emission particles layer in which second emission particles emitting light at a second wavelength different from the first wavelength by the excitation energy are distributed over the one-dimensional extent;
a first spacer layer that separates the first emission particles layer and the second emission particles layer in a direction intersecting the one-dimensional extent, wherein the first spacer layer includes an excitation energy absorbent that absorbs the excitation energy;
a third emission particles layer in which third emission particles emitting light at a third wavelength different from the first wavelength and the second wavelength by the excitation energy are distributed over the one-dimensional extent;
a fourth emission particles layer in which fourth emission particles emitting light at a fourth wavelength different from the first wavelength, the second wavelength, and the third wavelength by the excitation energy are distributed over the one-dimensional extent;
a second spacer layer that separates the third emission particles layer and the fourth emission particles layer in the direction intersecting the one-dimensional extent; and
an energy movement inhibition layer that separates the second emission particles layer and the third emission particles layer in the direction intersecting the one-dimensional extent,
wherein the first emission particles layer, the first spacer layer, the second emission particles layer, the energy movement inhibition layer, the third emission particles layer, the second spacer layer, and the fourth emission particles layer are sequentially laminated.

6. The displacement sensor according to claim 5, wherein an emission spectrum of one of the first emission particles and the second emission particles overlaps an absorption spectrum of another of the first emission particles and the second emission particles.

7. The displacement sensor according to claim 5, wherein at least one of a semiconductor nanoparticle and an organic dye is used as the first emission particles and the second emission particles.

8. The displacement sensor according to claim 5, wherein
the second emission particles are away from a contact surface of the displacement sensor farther than the first emission particles are, the contact surface being in contact with the measurement object, and
the second emission particles have a shorter emission peak wavelength than the first emission particles.

9. A displacement measurement system using the displacement sensor according to claim 1.

10. A pressure measurement system using the displacement sensor according to claim 1.

11. A displacement measurement system comprising:
the displacement sensor according to claim 1;
an excitation energy source that causes the first emission particles and the second emission particles included in the displacement sensor to emit light; and
a light receiver that receives light emitted from the displacement sensor.

* * * * *